3,383,151
TELESCOPIC SIGHT WITH VARIABLE ENLARGE-
MENT AND OPTICAL JOINT
Horst Köhler, Heidenheim (Brenz), and Roland Leinhos,
Oberkochen, Germany, assignors to Carl Zeiss-Stiftung,
doing business as Carl Zeiss, Heidenheim (Brenz),
Wurttemberg, Germany, a corporation of Germany
Filed July 30, 1964, Ser. No. 386,268
Claims priority, application Germany, Aug. 20, 1963,
Z 10,304
1 Claim. (Cl. 350—48)

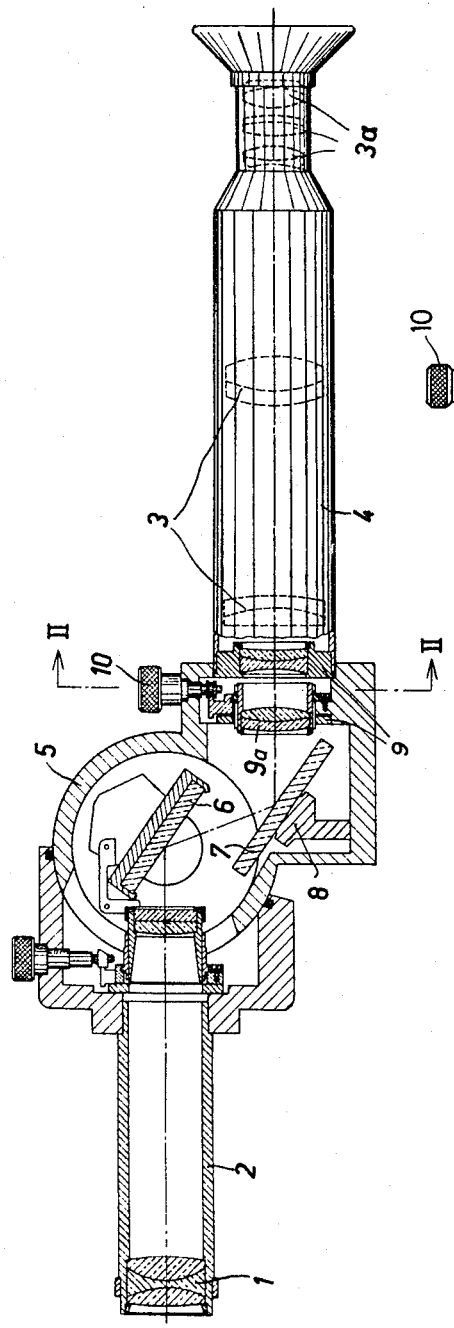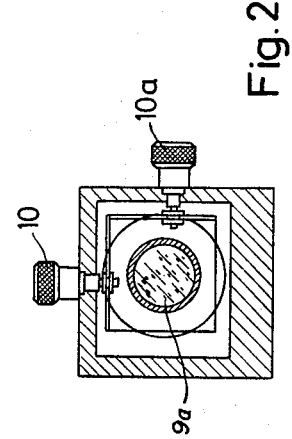

ABSTRACT OF THE DISCLOSURE

A telescopic sight with an objective tube and an ocular tube, the adjacent ends of which are connected to a housing composed of two parts which are pivotally connected with each other to form a pivotal joint. The housing has mounted therein an optical joint including a fixed reflector arranged oblique to the optical axis of the ocular tube and another reflector above said first reflector and in alignment with the optical axis of the objective tube and rotatable about an axis perpendicular to the optical axis of said objective tube. A pancratic lens enlargement changer is arranged in said ocular tube and an intermediary image producing lens system is arranged between said fixed reflector and said enlargement changer with means for adjusting at least one part of said intermediary image producing lens system in two directions perpendicular to the optical axis of said enlargement changer.

The invention relates to a telescopic sight equipped with an enlargement changer and an optical joint and in particular concerns the combination of such a telescopic sight with enlargement changer system and an adjustment device for centering the reticle or an image of the same in the entrance image plane of the enlargement changer.

Particularly in telescopic sights which extend through the diaphragm aperture of a gun, an optical joint similar as described in the U.S. patent specification No. 1,985,077 is inserted in the proximity of the trunnion of the gun, so that when the gun is adjusted in elevation, the objective tube and therewith the target line are able to follow the gun, while the ocular tube and therewith the observer need not be moved. Obviously, the axis of the optical joint has to remain precisely parallel to the trunnion axis of the gun bearing. In such telescopic sight arrangements one uses as a rule for the purpose of bore sighting the target line the adjustment of the reticle in two directions perpendicular to the optical axis.

If a telescopic sight having such optical joint is provided with a pancratic lens system, it is necessary to center the reticle or an image of the reticle in the entrance image plane of the enlargement changer in order that the target point does not travel out of the ocular image plane when the magnification is changed. If the reticle is positioned within the ocular image plane itself or in an image plane behind the enlargement changer, the centering has to be especially accurate so as to retain the target line when by changing the magnification an image of the target is to be brought in coincidence with the reticle. Such type of centering may be done with the aid of mechanical or optic-mechanical means which, for example, may consist of an eccentric mount for the objective, or of a pair of rotating optical wedges arranged in front of the enlargement changer. As a rule, however, there is no space available for such centering means or else the operation of these means is too cumbersome.

According to the present invention, an intermediate image reproducing system is arranged between the optical joint and the pancratic lens system (enlargement changer). Said intermediate image reproducing system has an image scale of about 1:1 and at least a part of it is adjustable in two directions perpendicular to the optical axis. This intermediary image reproducing system is "afocal," i.e. its image plane is virtual. With such an adjustable system it is possible to arrest the target line of the telescopic sight. If, for example, the reticle is arranged in front of the enlargement changer, the point which determines the target line in the first image plane is centered in the entrance image plane of the enlargement changer. The target line can be arrested in similar manner when the reticle is arranged in an image plane in back of the enlargement changer.

By arranging the additional intermediary image reproducing system between the ocular and the optical joint any complicated mechanical drives for its operation are dispensed with.

The accompanying drawing illustrates by way of example an embodiment of the invention:

FIG. 1 is a side elevation view of a telescopic sight with certain parts shown in section, and FIG. 2 is a cross-sectional view along the line II—II of FIG. 1.

Referring to FIG. 1 of the drawing, the telescopic sight is composed of a tube 2 having mounted in its front end an objective 1, and of a tube 4 which contains the ocular 3a and the pancratic lens system 3, i.e. the enlargement changer. The rear end of tube 2 and the front end of tube 4 are mechanically pivotally connected with one another by a housing 5. The latter has mounted therein an optical joint comprising the plane reflecting members 6 and 7 arranged one below the other with their reflecting faces inclined toward the axes of the tubes 2 and 4. The mechanical pivot axis of the housing 5 forms at the same time the pivot axis for the objective tube 2 and the plane mirror 6 of the optical joint whose other plane mirror 7 is fixedly mounted on a bearing bracket 8. In front of the lens system 3 and between the latter and the optical joint 6, 7 is arranged an "afocal" intermediary image reproducing system 9 which has a virtual image plane and a scale of about 1:1 and a part 9a of which is adjustable in two directions perpendicular to the optical axis of the ocular tube 4. The intermediary image reproducing system is adjusted in the direction transverse to the optical axis of the objective by a spindle operated by the rotatable knob 10, while for the adjustment vertical to the plane of drawing is provided a similar adjusting member 10a as shown in FIG. 2.

What we claim is:

1. In a telescopic sight, a first tube provided at one end with an objective, a second tube provided at one end with an ocular, a housing comprising two movably connected parts attached to the other ends of said tubes and forming a mechanical joint between said tubes, means forming an optical joint arranged within said housing, said optical joint including a first plane reflector fixedly mounted at an oblique angle with respect to the optical aixs of said ocular and a second plane reflector above said fixed reflector and in alignment with the optical axis of said objective and rotatable about an axis perpendicular to the optical axis of said objective to reflect light from said objective to said first reflector as said first tube and objective are angularly adjusted with respect to said second tube, a pancratic lens enlargement changer arranged in said second tube between said ocular and said fixedly mounted reflector of said optical joint, an intermediary image producing lens system arranged in said housing between said fixedly mounted reflector and said enlargement changer, said intermediary image producing lens system having a virtual image plane and an image scale of about 1:1, and means for adjusting at least one part of said intermediary image producing lens system in two directions perpendicular to the optical axis of said enlargement changer.

References Cited

UNITED STATES PATENTS

| | | | |
|---|---|---|---|
| 1,985,077 | 12/1934 | Burkhardt | 88—1 |
| 3,045,545 | 7/1962 | Korones et al. | 350—42 |
| 2,843,013 | 7/1958 | Keuffel et al. | 350—48 |
| 2,949,816 | 8/1960 | Weaver | 350—10 |

DAVID H. RUBIN, *Primary Examiner.*

M. J. TOKAR, *Assistant Examiner.*